(12) United States Patent
Dizinno et al.

(10) Patent No.: US 8,560,351 B1
(45) Date of Patent: Oct. 15, 2013

(54) SYSTEMS AND METHODS FOR REQUESTING DELETION OF NAMED INSURED FROM INSURANCE POLICY

(75) Inventors: Robert John Dizinno, San Antonio, TX (US); James T. Karras, San Antonio, TX (US); John P. Piper, San Antonio, TX (US); Cecilia L. Jenkins, San Antonio, TX (US); Eric C. Laechelin, San Antonio, TX (US); Sandra R. Sarkardehi, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1000 days.

(21) Appl. No.: 12/132,330

(22) Filed: Jun. 3, 2008

(51) Int. Cl.
*G06Q 40/00* (2012.01)

(52) U.S. Cl.
USPC .................. 705/4; 705/38; 705/35; 705/36 R; 705/1.1

(58) Field of Classification Search
USPC ................ 705/1, 4, 1.1, 38, 27, 35, 39, 36 R; 726/16; 709/246
See application file for complete search history.

(56) References Cited

U.S. PATENT DOCUMENTS

| 7,277,861 | B1 * | 10/2007 | Benson et al. ................. 705/4 |
| 2002/0095249 | A1 | 7/2002 | Lang |
| 2002/0116228 | A1 * | 8/2002 | Bauer et al. .................. 705/4 |
| 2003/0093302 | A1 | 5/2003 | Quido et al. |
| 2004/0148201 | A1 | 7/2004 | Smith et al. |
| 2005/0071202 | A1 | 3/2005 | Kendrick |

OTHER PUBLICATIONS

"Online Automobile Insurance" SENG 609.23: Object Oriented Analysis and Design project; Kendra Hamilton & Guy Davis; Apr. 22, 2004.*
Hamilton, Kendra et al., "Online Automobile Insurance: Object Oriented Analysis and Design Project", Apr. 4, 2004. 44 pages.

* cited by examiner

*Primary Examiner* — John H Holly
(74) *Attorney, Agent, or Firm* — Schwegman Lundberg Woessner P.A.

(57) ABSTRACT

An insurance policy names therein a number of named insureds. In response to a request to delete a particular person as a named insured from the policy, the requestor is interrogated by a computer service based on an accessed predetermined set of rules for deleting the identified named insured and also based on accessed relevant data regarding the policy and the identified named insured. Thereafter, the requestor is supplied with one of an approval and a denial of the request to delete the identified named insured.

21 Claims, 3 Drawing Sheets

SYSTEMS AND METHODS FOR REQUESTING DELETION OF NAMED INSURED FROM INSURANCE POLICY

CROSS REFERENCE TO RELATED APPLICATIONS

This application is related to U.S. patent application Ser. No. 12/236,714 filed Sep. 24, 2008, and U.S. patent application Ser. No. 12/236,728 filed Sep. 24, 2008, filed as divisional applications of the instant application, the disclosures of which are incorporated in their entirety.

FIELD

The present disclosure is directed to systems and methods that allow a requestor to request deletion of a named insured from an insurance policy. More particularly, the present disclosure is directed to such systems and methods that honor the request from the requestor only if a sufficient reason is provided and no conflicting obligation exists that would cause the request to be denied. Even more particularly, the present disclosure is directed to such systems and methods that allow the requestor to request the deletion of a driver from an automobile insurance policy.

BACKGROUND

In each of many types of insurance policies, each of one or more persons are declared within the policy as being a named insured for whom the policy is specifically written. For one example, in an insurance policy on the life of one or more persons, each such person is a named insured. For another example, in an insurance policy on property, each owner of the property may be a named insured, as may be any entity holding a creditor interest in the property, such as for example a mortgagee. For yet another example, in an insurance policy on one or more automobiles of a household, each licensed driver of the household may be a named insured.

Significantly, by being a named insured in any insurance policy, a person may have rights that arise from the insurance policy and may also have responsibilities that arise from the insurance policy. As an example of the former, a person as a named insured in an insurance policy on property may have the right to collect insurance proceeds in the event of a property loss such as a fire or a theft. As an example of the latter, a person as a named insured in an insurance policy on an automobile must not intentionally do any harm to any automobile insured under such policy, especially if the person wishes to collect insurance proceeds to cover a loss resulting from such harm.

From the point of view of an insurance company, each of one or more certain persons or entities must be a named insured on certain insurance policies. For one example, in an insurance policy on real property, it may be that each owner of the real property must be a named insured. Otherwise, in the event of a loss where insurance proceeds are distributed, the insurance company could be unnecessarily involved in a dispute over such insurance proceeds between a collecting named insured owner and a non-collecting non-named insured owner. For another example, in an insurance policy on an automobile of a household, it may be that each licensed driver of the household must be a named insured. Otherwise, and taking into consideration that the basis of the insurance is the automobile involved in a loss and not the driver driving the automobile at the time of the loss, the insurance company could be liable for a loss in connection with the automobile incurred by a non-named insured driver of the household even though the insurance company did not consider such non-named insured driver when taking into account the risk to be insured against.

Notably, and from the point of view of a person obtaining an insurance policy, there are incentives for not including a person as a named insured on an insurance policy. For one example, it may be that having the person as a named insured on the policy increases the premium that must be paid for the policy. For another example, it may be that the person is deemed an undesirable risk and having the person as a named insured on the policy causes the insurance company to decline to issue such policy. For yet another example, it may be that the person as a named insured on the policy re-categorizes the policy into a less desirable area of the insurance company, such as for example may be employed to service higher risk situations.

One particularly relevant situation where there is an incentive to not include a person as a named insured and that may be exemplary is with regard to an insurance policy on an automobile of a household where the driver is a youth. From the point of view of a typical insurance company, and as was alluded to above, the youth must be a named insured on the policy if the youth is a member of the household and presumably will be driving the automobile in at least some circumstances. However, from the point of view of the policy owner paying the premium for such policy, which would typically be a parent of the youth, the prospect of having the youth as a named insured on the policy will likely mean a substantial increase in the premium, especially inasmuch as a youth statistically has a much higher risk of incurring a loss in connection with the policy. Thus, the policy owner paying the premium would like to delete the youth as a named insured on the policy if at all possible.

Of course, other situations abound where a policy owner would like to delete a particular person as a named insured on an insurance policy, and at the same time the insurance company issuing the policy would consider it necessary that the particular person be included as a named insured on the policy. In a similar manner, situations abound where a policy owner would like to delete a particular person as a named insured on an insurance policy, but doing so would not be advisable or could raise issues. As a result, insurance companies heretofore have not allowed a person to be deleted as a named insured from at least some types of insurance policies without at least a conversation with a representative of the insurance company that could ascertain why the deletion of the person is being requested.

Notably, too, such a conversation has heretofore been conducted in an ad hoc manner without benefit of any specific process that must be followed to determine whether deleting the person from the policy is in fact allowable. As a result, two different conversations based on similar facts could nevertheless result in opposite deletion decisions.

Accordingly, a need exists for a specific process that is to be followed in determining whether to delete a person from an insurance policy. Moreover, a need exists for such a specific process that may be implemented by a computing device so that the computerized process can be performed for a policy owner by a representative of the insurance company, or even by the policy owner himself or herself, who would access the computerized process by way of a computing device thereof coupled to a service of the insurance company by way of an inter-network connection such as the Internet.

SUMMARY

The aforementioned needs are satisfied at least in part by a system and method with regard to an insurance policy naming therein each of a number of persons as a named insured with respect to the policy such that the policy specifically covers each named insured. The system and method are employed to respond to a request to delete a particular person as a named insured from the policy.

Access is allowed to a service at a computing system of an insurance company that issued the policy by a person at a computing device communicatively coupled to the computing system, and the request to delete a particular person as a named insured from the policy is received from the person. A list of named insureds is presented to the person with respect to the policy, and an identification is received of the particular person as the named insured to be deleted from the policy.

The person is then interrogated regarding the request to delete the identified named insured. The interrogation is performed based on an accessed predetermined set of rules for deleting the identified named insured and also based on accessed relevant data regarding the policy and the identified named insured. Thereafter, the person is supplied with one of an approval and a denial of the request to delete the identified named insured.

In various embodiments, the policy is an automobile policy and the named insured is a driver covered by the automobile policy. Also in various embodiments, the person is supplied with an approval of the request to delete the identified named insured, the identified named insured is deleted from the policy, and the deleted named insured is moved to a new insurance policy.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
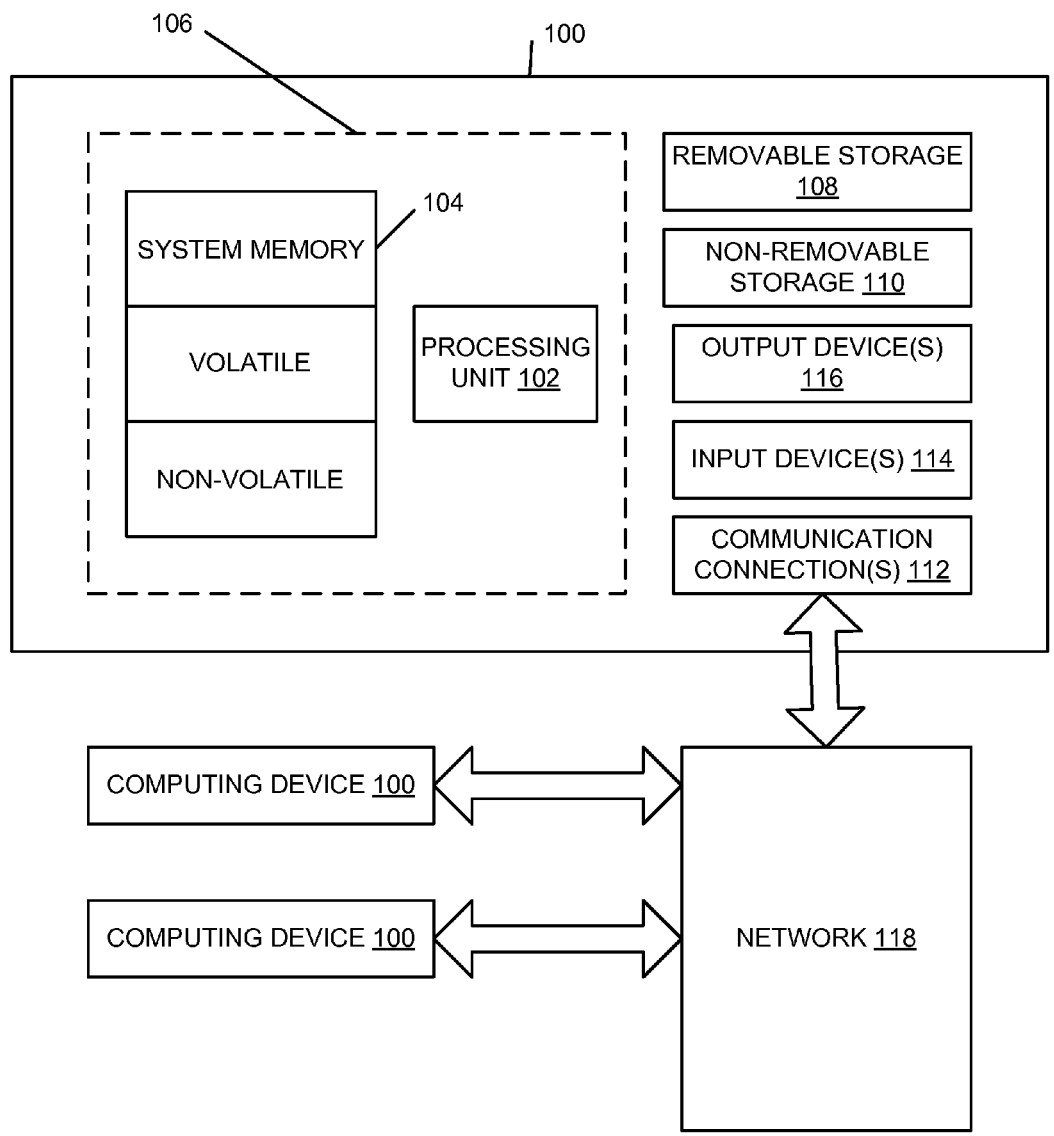
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Requesting Deletion of Named Insured from Insurance Policy

Figure 2:
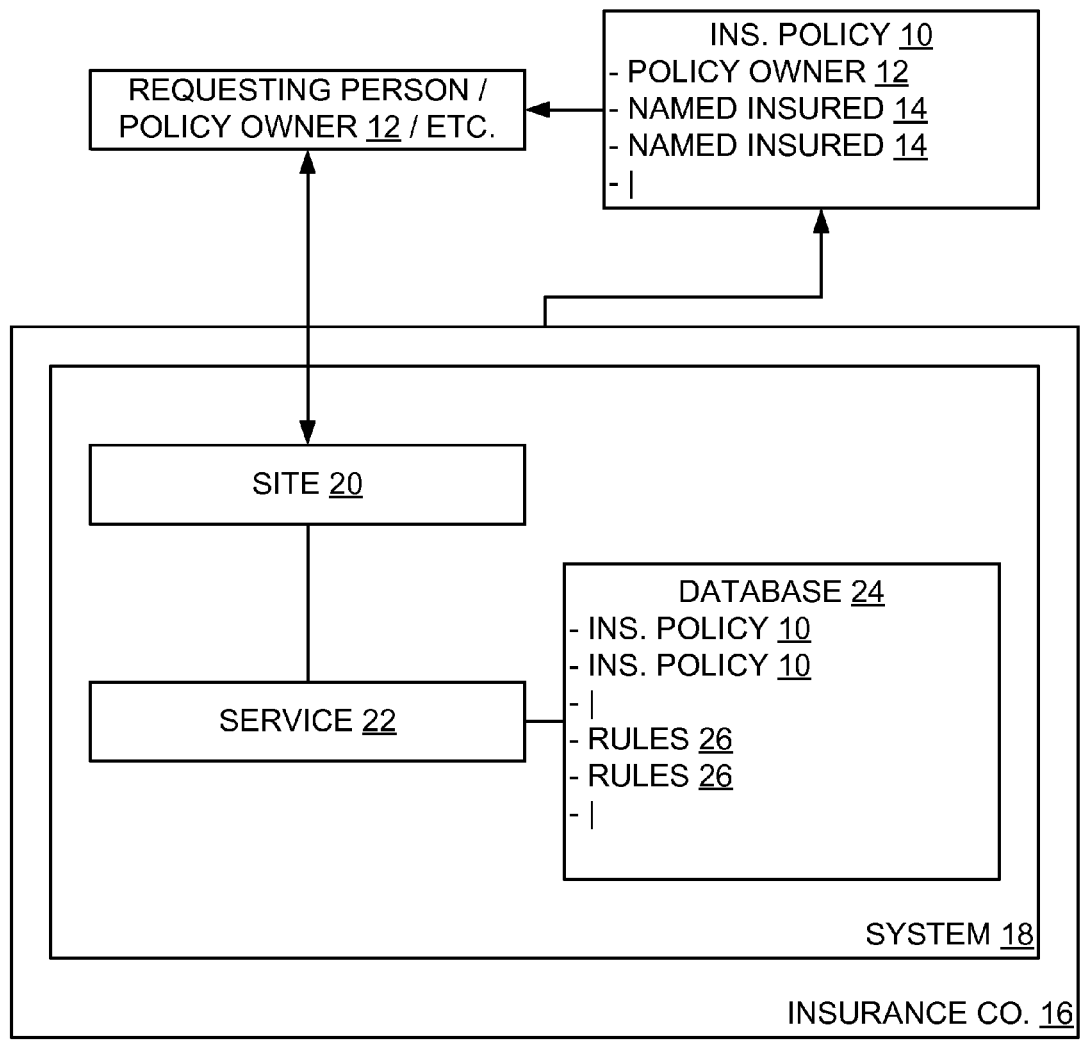
FIG. 2 is a block diagram of a system for employed by a person to request that a named insured be deleted from an insurance policy in accordance with various embodiments of the present innovation.

Turning now to FIG. 2, it is seen that an insurance policy 10 of some type issued to a policy owner 12 and names therein each of a number of persons as a named insured 14 or the like, perhaps including the policy owner 12. As may be appreciated, the insurance policy 10 may be most any appropriate insurance policy, as may be the policy owner 12 and each named insured 14, all without departing from the spirit and scope of the present innovation. For example, the policy 10 may be for real property, an automobile, personal property, and the like. Likewise, the policy owner 12 may be the owner of the item insured or a representative thereof.

Depending on the type of policy 10, each named insured 14 should appropriately vary. For example, for real property, each named insured 14 should be an owner of the property or at least an entity having a recognizable legal interest in the property, while for an automobile, each named insured 14 should be a licensed driver that is expected to drive the automobile on a regular basis, including all licensed drivers residing at the household where the automobile is based. Note here that in at least some instances the policy 10 may not actually employ the term 'named insured' even though a number of persons are listed in the policy 10 as being covered thereby.

As was pointed out above, by being a named insured 14 in any insurance policy 10, a person is specifically covered by the policy 10 and has both rights and responsibilities with regard to the policy 10. Additionally, the insurance company 16 that issues the policy 10 likely calculates a premium as paid for such policy 10 by the policy owner 12 or the like based at least in part on a risk assessment of each named insured. Accordingly, a relatively higher risk named insured 14 may cause the premium to increase while a relatively lower risk named insured 14 may cause the premium to decrease.

Thus, from the point of view of the policy owner 12, it may be advantageous to delete a certain person as a named insured 14 from a policy 10, such as for example the aforementioned youth driver from a policy 10 for an automobile. In doing so, a substantially increased premium can be avoided. From the point of view of an insurance company 16, however, and again, it may be advantageous to prevent deletion of such certain person, such as for example if the youth river is a member of the household where the automobile is based and thus can legitimately be expected to drive such automobile on a regular basis. Otherwise, the insurance company 16 could be liable for a loss incurred by such a youth as a non-named insured driver of the household even though the insurance company 16 did not consider such non-named insured driver when taking into account the risk to be insured against.

Of course, other situations abound where a policy owner 12 would like to delete a particular person as a named insured 14 on an insurance policy 10, and at the same time the insurance company 16 issuing the policy 10 would consider it necessary that the particular person be included as a named insured 14 on the policy 10. In a similar manner, situations abound where a policy owner 12 would like to delete a particular person as a named insured 14 on an insurance policy 10, but doing so would not be advisable or could raise issues.

Accordingly, and in various embodiments of the present innovation, the insurance company 16 employs a system 18 that allows a person to be deleted as a named insured 14 from at least some types of insurance policies 10, particularly without requiring a conversation with a representative of the insurance company 10. Such system 18 instantiates a specific process that must be followed to determine whether deleting the person as a named insured from the policy 10 is in fact allowable.

As seen in FIG. 2, the system 18 provides a site 20 that allows a person at a computing device thereof to communicatively couple thereto to access the system. The person may be a policy owner 12 or the like in which case the communicative coupling is likely external to the insurance company 16. In any case, the site 20 may be any appropriate site, and fronts a deletion service 22 or the like instantiated on a server or the like of the system 18.

As may be appreciated, such person would log into the site 20 in an appropriate manner and by way of log-in credentials such as a user ID and password or the like, in which case the site 20 would identify the person based on such log-in credentials and in turn would identify a particular policy 10 that the person has rights to modify. Note that the person may be able to modify multiple policies 10, in which case such person would have to identify the particular policy 10 to be modified. Presumably, the person and the policy 10 would be identified by way of appropriate reference by the deletion service 22 of the system 18 to a database 24 of the insurance company 16 within which is appropriately stored such information.

Figure 3:
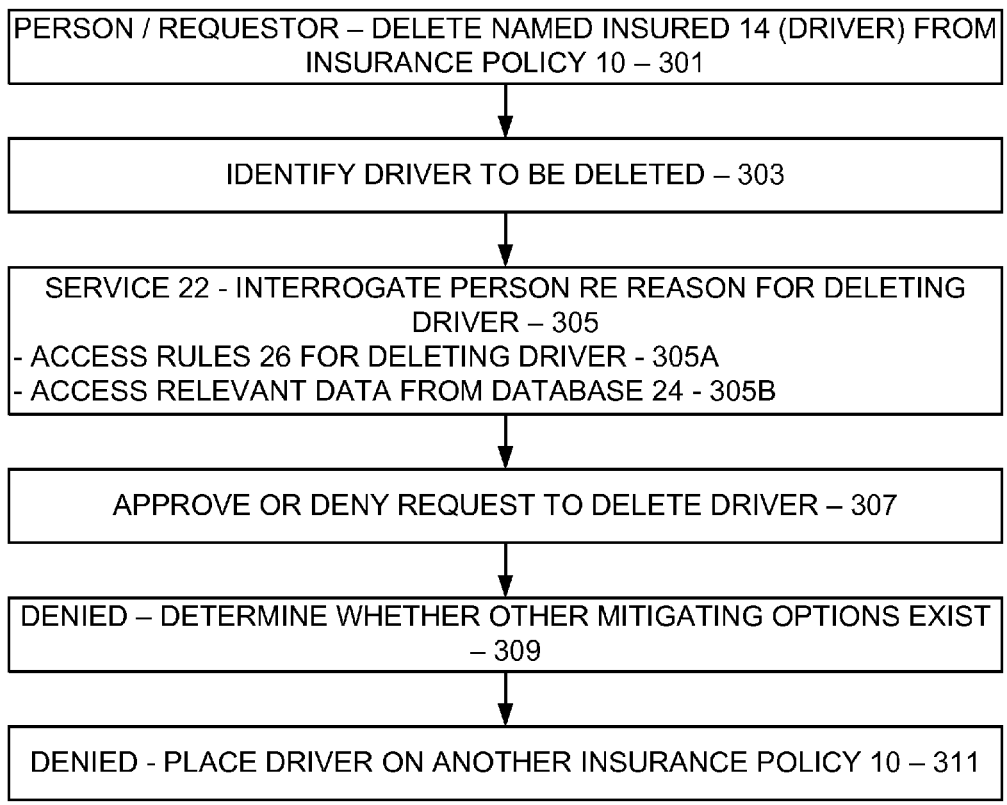
FIG. 3 is a flow diagram showing key actions performed in connection with the system of FIG. 2 in accordance with various embodiments of the present innovation.

Turning now to FIG. 3, it is seen that the person at the site 20 would select from among a number of presented options to delete a named insured 14 or the like from the particular policy 10 (301). Presuming that the policy 10 is for an automobile of a household, the named insured 14 or the like would be a licensed driver or the like listed on the policy 10, and the person would thus identify the driver to be deleted from a list of drivers obtained by the service 22 from the database 24 and displayed at the site 20 (303).

At this point, the service 22 by way of the site 20 would interrogate the person as to the reason for deleting the driver (305). Note here that the interrogation would be based on accessing a predetermined set of rules 26 for deleting such driver (305a) and also based on accessing relevant data regarding the policy 10, the driver to be deleted, and the like from the database 24 and perhaps other databases (305b). As may be appreciated, such predetermined set of rules 26 may be any appropriate rules, and likely may be organized into a decision tree or the like the result of which would be an approval or denial of the request to delete the driver (307).

Such rules 26 and such tree although not known should nevertheless now be apparent based on the present disclosure to the relevant public and therefore need not be set forth herein in any detail other than that which is provided. Moreover, such rules 26 and such tree may take a multitude of forms and may vary from company 16 to company 16 and perhaps even within a company 16 based on classes of policies 10 or the like. Accordingly, a definitive set of such rules 26 and a corresponding decision tree is not available and instead such rules 26 and such tree may be fittingly disclosed herein by way of non-limiting, non-comprehensive, and non-definitive examples.

In various embodiments of the present innovation, the person encounters the set of rules 26 and corresponding tree at the site 20 by way of a list of permissible reasons for deleting a driver as presented by the service 22. Such permissible reasons may for example include that the driver to be deleted is: no longer the financial dependent of the policy owner 12, in which case the driver to be deleted is presumably a child or youth; away at school, again in which case the driver to be deleted is presumably a child or youth; insured on another automobile policy 10; no longer lives in the household; no longer licensed as a driver; at least temporarily incapable of driving due to a medical condition; and the like.

As should be understood, upon selecting a permissible reason, the interrogation continues based on additional questions specific to the selected reason. For example, in the instance where a driver is to be deleted as no longer licensed as a driver, further queries may be displayed as to what happened, including whether the license was returned voluntarily, suspended, revoked, or merely taken away, presumably by a parent or guardian, among others. In this particular situation, the license being returned voluntarily, suspended, or revoked is a fairly definitive showing that the driver cannot drive, and therefore may be acceptable reasons that gain an allowance of the request to delete the driver. However, the license being merely taken away is not likewise such a fairly definitive showing that the driver cannot drive, and therefore may not be an acceptable reason that gains an allowance of the request to delete the driver. Of course, other further queries are performed based on other selected reasons.

Examining the rules 26 in some additional detail, it may be that one example of a rule 26 from within such set of rules 26 is that a named insured 14 as a driver on a policy 10 for an automobile of a household should not be allowed to be deleted if the driver is resident in the household, as was set forth above. Accordingly, the site 20 would interrogate the person regarding where the driver to be deleted resides. If in the household, the requested deletion may be denied. Note here, though, that an alternative may be to approve the deletion only if the person allows the driver to be explicitly named as a non-named insured 14 in the policy 10 such that any loss caused by such driver would not be covered by the policy 10. Note too that another alternative may be to approve the deletion only if the person allows the driver to be listed as a named insured 14 on a different policy 10 for an automobile as offered by the company 16. In this particular instance, the service 22 may determine from the database 24 an age for the driver as at 305b inasmuch as a driver below a certain age may not be able to be listed as a named insured 14 on certain policies 10, in which case the alternative may not be viable.

Note further that although the driver may be denied as at 307, other options exist that would perhaps mitigate the denial. Accordingly, and in various embodiments of the present innovation, the rules 26 and tree as employed by the service 22 at the site may also include checking to see if such other mitigating options exist (309). For example, one mitigating option for a resident driver of a household is to determine whether the resident driver is away from the household on an extended basis and thus less likely to use the automobile covered by the policy 10. In such an instance, it may be that the driver is away at school or in the armed forces or the like. Thus, the policy 10 would qualify for an away discount with respect to the driver inasmuch as the risk of loss from such driver is reduced due to being away. In a similar manner, another mitigating option for a resident driver of a household is to determine whether the resident driver is a student with good grades and thus presumably more mature. Here, the policy 10 would qualify for a good student discount with respect to the driver inasmuch as the risk of loss from such driver is reduced due to such maturity.

Another example of a rule 26 from within such set of rules 26 is that a named insured 14 as a driver on a policy 10 for an automobile of a household should not be allowed to be deleted if a related policy 10 exists and such related policy 10 requires that the driver be a named insured 14 on the policy 10 for the automobile. One such related policy 10 may be an umbrella policy 10, for example, which typically requires more stringent terms in the policy 10 for the automobile, although other related policies 10 may also exist that require that the driver be a named insured 14 on the policy 10 for the automobile.

Still another example of a rule 26 from within such set of rules 26 is that a named insured 14 as a driver on a policy 10 for an automobile of a household should be allowed to be deleted if due to a medical reason the driver is not capable of in fact driving, at least for a period of time longer than some minimum amount. Here, the risk from such driver is minimal due to such medical incapacity, and therefore it is reasonable to approve deletion. Note here that such medical incapacity is likely not shown by any data available to the service 22 from a database 24 or the like as at 305*b*. Accordingly, the service 22 likely will approve such deletion based on the presumed truthfulness of an assertion from the person accessing such system 18 by way of the site 18, perhaps with the option of verifying such assertion at a later time.

Significantly, and in various embodiments of the present innovation, when a driver is allowed to be deleted by the service 22, the service 22 in at least some instances places the driver on another insurance policy 10 (311), either at the behest of the person that requested the deletion or automatically. In one particular instance, the driver may be a child or young adult being deleted from a policy 10 of a parent as no longer a financial dependent, while in another particular instance, the driver may be a spouse in the process of separating or becoming divorced and being deleted from a policy 10 of the other spouse as no longer a financial dependent. In either instance, the service 22 may initiate issuance of a new policy 10 for the deleted child or deleted spouse, again either automatically or at the behest of the person that requested the deletion. Note here that the new policy 10 may be a non-owner's policy 10 if the spouse or child does not have an automobile, or a regular policy 10 if the spouse or child does own an automobile.

If such a new policy 10 is issued automatically and presumably without any payment of a premium or portion thereof, it may be that the new policy 10 is only effective for a relatively short set period of time, perhaps 30 days or so, unless the appropriate premium or portion thereof for the new policy 10 is paid, most likely by the deleted spouse or child driver. Thus, the system 18 identifies an address and/or telephone number at which the deleted spouse or child driver may be contacted. Contact is then attempted therewith according to such identified address or telephone number to give the deleted driver an opportunity to accept the new policy 10 and pay the premium or portion thereof. Even if such a new policy 10 is not automatically issued, the system 18 may nevertheless contact the deleted driver to advise of such deletion, explain eligibility for the new policy 10, and advise that the deleted driver investigate further.

Thus far, the various embodiments of the present innovation have been set forth primarily in terms of an external person requesting to delete a named insured 14 or the like from an insurance policy 10 for an automobile of a household. However, and as should be appreciated, the external person may alternately be requesting to delete a named insured 14 or the like from another type of insurance policy 10, such as for example a policy 14 for real property, all without departing from the spirit and scope of the present innovation. As should also be appreciated, the requestor requesting such deletion may instead be an internal or external representative of the insurance company 10, perhaps on behalf of the external person, again without departing from the spirit and scope of the present innovation.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided that implement a specific process that is to be followed in determining whether to delete a named insured 14 or the like from an insurance policy 10. The specific process is implemented by a computing device so that the computerized process can be performed for a policy owner 12 by a representative of the insurance company 16 that issues the policy 10 or by the policy owner 12 himself or herself, or by another appropriate person who would access the computerized process by way of a computing device thereof coupled to a site 20 of a service 22 of the insurance company 16 by way of an inter-network connection such as the Internet.

It should be appreciated that changes could be made to the embodiments described above without departing from the innovative concepts thereof. For example although the various embodiments of the present innovation are primarily set forth above in terms of an inter-network connection such as the Internet, particularly if the person requesting the deletion is external to the insurance company 16, such connection may be any other appropriate connection. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable medium having stored thereon computer-executable instructions implementing a method with regard to an insurance policy naming therein each of a number of persons as a named insured with respect to the policy such that the policy specifically covers each named insured, the method for being employed to respond to a request to delete a particular person as a named insured from the policy and comprising:

allowing access to a service at a computing system of an insurance company that issued the policy by a person at a computing device communicatively coupled to the computing system;

receiving an identification of the policy;

receiving from the person the request to delete a particular person as a named insured from the policy; presenting to the person a list of named insureds with respect to the policy;

receiving from the person an identification from the presented list of the particular person as the named insured to be deleted from the policy;

interrogating the person regarding the request to delete the identified named insured, the interrogation being performed based on an accessed predetermined set of rules for deleting the identified named insured and also based on accessed relevant data regarding the policy and the identified named insured; and supplying to the person one of an approval and a denial of the request to delete the identified named insured.

2. The medium of claim 1 wherein the person accessing the service is a policy owner with respect to the policy.

3. The medium of claim 1 wherein allowing access to the service includes receiving from the person an identification of the policy.

4. The medium of claim 1 wherein the accessed predetermined set of rules is organized into a decision tree the result of which is the one of the approval and the denial of the request to delete the identified named insured.

5. The medium of claim 1 wherein the interrogation is performed based on an accessed predetermined set of rules corresponding to a permissible reason for deleting the identified named insured as received from the person.

6. The medium of claim 1 wherein supplying a denial of the request includes supplying one of an alternative and a mitigating option.

7. The medium of claim 1 wherein supplying an approval of the request includes deleting the identified named insured from the policy and also moving the deleted named insured to another insurance policy.

8. A method with regard to an insurance policy naming therein each of a number of persons as a named insured with respect to the policy such that the policy specifically covers each named insured, the method for being employed to respond to a request to delete a particular person as a named insured from the policy and comprising:

allowing access by the computing system to a service at a computing system of an insurance company that issued the policy by a person at a computing device communicatively coupled to the computing system; receiving an identification of the policy;

receiving from the person the request to delete a particular person as a named insured from the policy;

presenting to the person a list of named insureds with respect to the policy;

receiving from the person an identification from the presented list of the particular person as the named insured to be deleted from the policy;

interrogating by the computing system the person regarding the request to delete the identified named insured, the interrogation being performed based on an accessed predetermined set of rules for deleting the identified named insured and also based on accessed relevant data regarding the policy and the identified named insured; and supplying to the person one of an approval and a denial of the request to delete the identified named insured.

9. The method of claim 8 wherein the person accessing the service is a policy owner with respect to the policy.

10. The method of claim 8 wherein allowing access to the service includes receiving from the person an identification of the policy.

11. The method of claim 8 wherein the accessed predetermined set of rules is organized into a decision tree the result of which is the one of the approval and the denial of the request to delete the identified named insured.

12. The method of claim 8 wherein the interrogation is performed based on an accessed predetermined set of rules corresponding to a permissible reason for deleting the identified named insured as received from the person.

13. The method of claim 8 wherein supplying a denial of the request includes supplying one of an alternative and a mitigating option.

14. The method of claim 8 wherein supplying an approval of the request includes deleting the identified named insured from the policy and also moving the deleted named insured to another insurance policy.

15. A system with regard to an insurance policy naming therein each of a number of persons as a named insured with respect to the policy such that the policy specifically covers each named insured, the system for being employed to respond to a request to delete a particular person as a named insured from the policy and comprising:

a subsystem that allows access to a service at a computing system of an insurance company that issued the policy by a person at a computing device communicatively coupled to the computing system;

a subsystem that receives an identification of the policy;

a subsystem that receives from the person the request to delete a particular person as a named insured from the policy;

a subsystem that presents to the person a list of named insureds with respect to the policy;

a subsystem that receives from the person an identification from the presented list of the particular person as the named insured to be deleted from the policy;

a subsystem that interrogates the person regarding the request to delete the identified named insured, the interrogation being performed based on an accessed predetermined set of rules for deleting the identified named insured and also based on accessed relevant data regarding the policy and the identified named insured; and a subsystem that supplies to the person one of an approval and a denial of the request to delete the identified named insured.

16. The system of claim 15 wherein the person accessing the service is a policy owner with respect to the policy.

17. The system of claim 15 wherein the subsystem that allows access to the service includes a subsystem that receives from the person an identification of the policy.

18. The system of claim 15 wherein the accessed predetermined set of rules is organized into a decision tree the result of which is the one of the approval and the denial of the request to delete the identified named insured.

19. The system of claim 15 wherein the interrogation is performed based on an accessed predetermined set of rules corresponding to a permissible reason for deleting the identified named insured as received from the person.

20. The system of claim 15 wherein the subsystem that supplies a denial of the request includes a subsystem that supplies one of an alternative and a mitigating option.

21. The system of claim 15 wherein the subsystem that supplies an approval of the request includes a subsystem that deletes the identified named insured from the policy and also a subsystem that moves the deleted named insured to another insurance policy.

* * * * *